US012394352B2

(12) United States Patent
Kang et al.

(10) Patent No.: US 12,394,352 B2
(45) Date of Patent: Aug. 19, 2025

(54) DISPLAY DEVICE AND GAMMA VOLTAGE SETTING METHOD THEREOF

(71) Applicant: Samsung Display Co., Ltd., Yongin-Si (KR)

(72) Inventors: Yoon Kang, Yongin-si (KR); Min Weun Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/633,739

(22) Filed: Apr. 12, 2024

(65) Prior Publication Data

US 2025/0124840 A1 Apr. 17, 2025

(30) Foreign Application Priority Data

Oct. 11, 2023 (KR) ........................ 10-2023-0135343

(51) Int. Cl.
*G09G 3/20* (2006.01)
*G09G 3/3233* (2016.01)

(52) U.S. Cl.
CPC ......... *G09G 3/2007* (2013.01); *G09G 3/3233* (2013.01); *G09G 2300/0819* (2013.01); *G09G 2300/0842* (2013.01); *G09G 2310/027* (2013.01); *G09G 2320/041* (2013.01); *G09G 2320/0673* (2013.01)

(58) Field of Classification Search
CPC ............... G09G 3/2007; G09G 3/3233; G09G 2300/0819; G09G 2300/0842; G09G 2310/027; G09G 2320/041; G09G 2320/0673
See application file for complete search history.

(56) References Cited

U.S. PATENT DOCUMENTS 7,696,977 B2 4/2010 Lee et al.
9,478,166 B2 * 10/2016 Pyo ...................... G09G 3/3233
10,586,504 B2 * 3/2020 Shin ..................... G09G 3/3677
11,257,417 B2 2/2022 Yim et al.
11,322,075 B2 * 5/2022 Pyo .......................... G09G 3/22
11,699,379 B2 7/2023 Pyo
2007/0182694 A1 * 8/2007 Lee ...................... G09G 3/3696 345/101

(Continued)

FOREIGN PATENT DOCUMENTS

KR 10-0734311 B1 7/2007
KR 10-1552993 B1 9/2015

(Continued)

*Primary Examiner* — Kenneth Bukowski
(74) *Attorney, Agent, or Firm* — Innovation Counsel LLP

(57) ABSTRACT

A gamma voltage setting method of a display device includes: supplying, to a data driver, data corresponding to a specific grayscale of a specific dimming level; generating a data signal corresponding to the data in the data driver, using a gamma voltage corresponding to a processing gamma value; displaying an image corresponding to the data signal in a pixel unit; determining a temperature of the pixel unit; loading, from a look-up table, a target luminance and a target color coordinate, which correspond to the specific dimming level, the specific grayscale, and the temperature of the pixel unit; generating a gamma value such that an image corresponding to the target luminance and the target color coordinate is displayed in the pixel unit; and storing the gamma value.

13 Claims, 10 Drawing Sheets

| DIMMING LEVEL(DEV) | GRAYSCALE(Gray) | TEMPERATURE(°C) | LUMINANCE(nit) | COLOR COORDINATE |
|---|---|---|---|---|
| 1 | 10 | 0 | 45 | x=0.304, y=0.316 |
| | | 10 | 50 | x=0.304, y=0.317 |
| | | ... | ... | ... |
| | | 40 | 80 | x=0.304, y=0.318 |
| | | 50 | 100 | x=0.305, y=0.320 |
| | | ... | ... | ... |
| | 60 | 0 | 200 | x=0.304, y=0.324 |
| | | 10 | 255 | x=0.305, y=0.325 |
| | | ... | ... | ... |
| | | 40 | 355 | x=0.309, y=0.329 |
| | | 50 | 400 | x=0.310, y=0.330 |
| | | ... | ... | ... |
| | ... | ... | ... | ... |
| | 255 | 0 | 700 | x=0.305, y=0.319 |
| | | 10 | 800 | x=0.305, y=0.320 |
| | | ... | ... | ... |
| | | 40 | 1000 | x=0.313, y=0.329 |
| | | 50 | 1500 | x=0.320, y=0.335 |
| | | ... | ... | ... |
| ... | | | | |
| P | 10 | 0 | 50 | x=0.305, y=0.317 |
| | | 10 | 70 | x=0.305, y=0.318 |
| | | ... | ... | ... |
| | | 40 | 100 | x=0.305, y=0.319 |
| | | 50 | 150 | x=0.306, y=0.321 |
| | | ... | ... | ... |
| | 60 | 0 | 250 | x=0.305, y=0.325 |
| | | 10 | 300 | x=0.306, y=0.326 |
| | | ... | ... | ... |
| | | 40 | 400 | x=0.310, y=0.330 |
| | | 50 | 500 | x=0.311, y=0.331 |
| | | ... | ... | ... |
| | ... | ... | ... | ... |
| | 255 | 0 | 800 | x=0.306, y=0.320 |
| | | 10 | 900 | x=0.306, y=0.321 |
| | | ... | ... | ... |
| | | 40 | 1200 | x=0.314, y=0.330 |
| | | 50 | 1800 | x=0.321, y=0.336 |
| | | ... | ... | ... |

(56) References Cited

U.S. PATENT DOCUMENTS

2015/0138251 A1* 5/2015 Pyo .................. G09G 3/3233 345/82
2018/0293945 A1* 10/2018 Wang .................. G09G 3/3291
2020/0219433 A1* 7/2020 Yim .................. G09G 5/026
2023/0085452 A1* 3/2023 Pyo .................. G09G 3/32 345/690
2023/0230541 A1* 7/2023 Kim .................. G09G 3/3208 345/698
2024/0412676 A1* 12/2024 Kim .................. G09G 3/3233

FOREIGN PATENT DOCUMENTS

KR 10-2023-0040398 A 3/2023
KR 10-2599506 B1 11/2023

* cited by examiner

FIG. 4

| DIMMING LEVEL(DEV) | GRAYSCALE(Gray) | TEMPERATURE(°C) | LUMINANCE(nit) | COLOR COORDINATE |
|---|---|---|---|---|
| 1 | 10 | 0 | 45 | x=0.304, y=0.316 |
| | | 10 | 50 | x=0.304, y=0.317 |
| | | ··· | ··· | ··· |
| | | 40 | 80 | x=0.304, y=0.318 |
| | | 50 | 100 | x=0.305, y=0.320 |
| | | ··· | ··· | ··· |
| | 60 | 0 | 200 | x=0.304, y=0.324 |
| | | 10 | 255 | x=0.305, y=0.325 |
| | | ··· | ··· | ··· |
| | | 40 | 355 | x=0.309, y=0.329 |
| | | 50 | 400 | x=0.310, y=0.330 |
| | | ··· | ··· | ··· |
| | ··· | ··· | ··· | ··· |
| | 255 | 0 | 700 | x=0.305, y=0.319 |
| | | 10 | 800 | x=0.305, y=0.320 |
| | | ··· | ··· | ··· |
| | | 40 | 1000 | x=0.313, y=0.329 |
| | | 50 | 1500 | x=0.320, y=0.335 |
| | | ··· | ··· | ··· |
| ··· | | | | |
| p | 10 | 0 | 50 | x=0.305, y=0.317 |
| | | 10 | 70 | x=0.305, y=0.318 |
| | | ··· | ··· | ··· |
| | | 40 | 100 | x=0.305, y=0.319 |
| | | 50 | 150 | x=0.306, y=0.321 |
| | | ··· | ··· | ··· |
| | 60 | 0 | 250 | x=0.305, y=0.325 |
| | | 10 | 300 | x=0.306, y=0.326 |
| | | ··· | ··· | ··· |
| | | 40 | 400 | x=0.310, y=0.330 |
| | | 50 | 500 | x=0.311, y=0.331 |
| | | ··· | ··· | ··· |
| | ··· | ··· | ··· | ··· |
| | 255 | 0 | 800 | x=0.306, y=0.320 |
| | | 10 | 900 | x=0.306, y=0.321 |
| | | ··· | ··· | ··· |
| | | 40 | 1200 | x=0.314, y=0.330 |
| | | 50 | 1800 | x=0.321, y=0.336 |
| | | ··· | ··· | ··· |

FIG. 6

| DIMMING LEVEL(DEV) | GRAYSCALE(Gray) | TEMPERATURE(°C) | GMR | GMG | GMB |
|---|---|---|---|---|---|
| 1 | 10 | 0 | GMR11a | GMG11a | GMB11a |
| | | 10 | GMR12a | GMG12a | GMB12a |
| | | ... | ... | ... | ... |
| | | 40 | GMR13a | GMG13a | GMB13a |
| | | 50 | GMR14a | GMG14a | GMB14a |
| | | ... | ... | ... | ... |
| | 60 | 0 | GMR21a | GMG21a | GMB21a |
| | | 10 | GMR22a | GMG22a | GMB22a |
| | | ... | ... | ... | ... |
| | | 40 | GMR23a | GMG23a | GMB23a |
| | | 50 | GMR24a | GMG24a | GMB24a |
| | | ... | ... | ... | ... |
| | ... | ... | ... | ... | ... |
| | 255 | 0 | GMR31a | GMG31a | GMB31a |
| | | 10 | GMR32a | GMG32a | GMB32a |
| | | ... | ... | ... | ... |
| | | 40 | GMR33a | GMG33a | GMB33a |
| | | 50 | GMR34a | GMG34a | GMB34a |
| | | ... | ... | ... | ... |
| ... | | | | | |
| p | 10 | 0 | GMR11b | GMG11b | GMB11b |
| | | 10 | GMR12b | GMG12b | GMB12b |
| | | ... | ... | ... | ... |
| | | 40 | GMR13b | GMG13b | GMB13b |
| | | 50 | GMR14b | GMG14b | GMB14b |
| | | ... | ... | ... | ... |
| | 60 | 0 | GMR21b | GMG21b | GMB21b |
| | | 10 | GMR22b | GMG22b | GMB22b |
| | | ... | ... | ... | ... |
| | | 40 | GMR23b | GMG23b | GMB23b |
| | | 50 | GMR24b | GMG24b | GMB24b |
| | | ... | ... | ... | ... |
| | ... | ... | ... | ... | ... |
| | 255 | 0 | GMR31b | GMG31b | GMB31b |
| | | 10 | GMR32b | GMG32b | GMB32b |
| | | ... | ... | ... | ... |
| | | 40 | GMR33b | GMG33b | GMB33b |
| | | 50 | GMR34b | GMG34b | GMB34b |
| | | ... | ... | ... | ... |

DISPLAY DEVICE AND GAMMA VOLTAGE SETTING METHOD THEREOF

CROSS-REFERENCE TO RELATED APPLICATION

The present application claims priority under 35 U.S.C. § 119 (a) to Korean patent application No. 10-2023-0135343, filed on Oct. 11, 2023, in the Korean Intellectual Property Office, the entire disclosure of which is incorporated herein by reference.

BACKGROUND

1. Technical Field

The present disclosure generally relates to a display device and a gamma voltage setting method thereof.

2. Related Art

With the development of information technologies, the importance of a display device which is a connection medium between a user and information increases. Accordingly, display devices such as a liquid crystal display device and an organic light emitting display device are increasingly used.

A display device may be supplied with data from a host, and convert the data into a data signal to be supplied to pixels, thereby displaying a predetermined image in a pixel unit. The display device may generate a data signal using a gamma voltage. Meanwhile, the luminance and color coordinate of the image displayed in the pixel unit may be changed according to a temperature of the display device, and accordingly, it is necessary for a temperature characteristic to be reflected when the gamma voltage is set for the first time (or during a manufacturing process).

SUMMARY

Embodiments provide a display device and a gamma voltage setting method thereof, in which a gamma voltage can be set in consideration of a temperature characteristic.

In accordance with an aspect of the present disclosure, there is provided a gamma voltage setting method of a display device, including: supplying data corresponding to a specific grayscale of a specific dimming level to a data driver; generating a data signal corresponding to the data in the data driver using a gamma voltage corresponding to a processing gamma value; displaying an image corresponding to the data signal in a pixel unit; determining a temperature of the pixel unit; loading, from a look-up table, a target luminance and a target color coordinate, which correspond to the specific dimming level, the specific grayscale, and the temperature of the pixel unit; generating a gamma value such that an image corresponding to the target luminance and the target color coordinate is displayed in the pixel unit; and storing the gamma value.

The gamma value may be stored in the display device during a manufacturing process of the display device.

The gamma value may include a first gamma value corresponding to a pixel of a first color, a second gamma value corresponding to a pixel of a second color, and a third gamma value corresponding to a pixel of a third color.

A plurality of dimming levels, a plurality of grayscales included in each of the plurality of dimming levels, and the target luminance and the target color coordinate, which correspond to at least two different temperatures in each of the plurality of grayscales, may be stored in the look-up table.

The gamma voltage setting method may further include sensing whether the image corresponding to the target luminance and the target color coordinate is displayed in the pixel unit using a camera.

In accordance with another aspect of the present disclosure, there is provided a gamma voltage setting method of a display device, including: supplying, to a data driver, data corresponding to a specific grayscale of a specific dimming level; generating a data signal corresponding to the data in the data driver using a gamma voltage corresponding to a processing gamma value; displaying an image in a pixel unit corresponding to the data signal; determining a temperature of the pixel unit; loading, from a look-up table, a gamma value corresponding to the specific dimming level, the specific grayscale, and the temperature of the pixel unit; and storing the gamma value.

The gamma value may be stored in the display device during a manufacturing process of the display device.

The gamma value may include a first gamma value corresponding to a pixel of a first color, a second gamma value corresponding to a pixel of a second color, and a third gamma value corresponding to a pixel of a third color.

A plurality of dimming levels, a plurality of grayscales included in each of the plurality of dimming levels, and the gamma value corresponding to at least two different temperatures in each of the plurality of grayscales may be stored in the look-up table.

In accordance with still another aspect of the present disclosure, there is provided a display device including: a pixel unit including pixels connected to scan lines and data lines; a data driver configured to supply a data signal to the data lines; a gamma voltage supplier configured to supply a gamma voltage to the data driver corresponding to a gamma value; a timing controller including a storage unit configured to store the gamma value and a look-up table; and a temperature sensor configured to sense a temperature of the pixel unit, wherein a plurality of dimming levels, a plurality of grayscales included in each of the plurality of dimming levels, and gamma value setting information corresponding to at least two different temperatures in each of the plurality of grayscales are stored in the look-up table, and wherein the gamma value setting information corresponds to a target luminance and a target color coordinate of the pixel unit which correspond to the different temperatures, or the gamma value corresponding to the different temperatures.

The gamma value may include a first gamma value corresponding to a pixel of a first color, a second gamma value corresponding to a pixel of a second color, and a third gamma value corresponding to a pixel of a third color.

The timing controller may display an image corresponding to a specific grayscale of a specific dimming level in the pixel unit during a manufacturing process, and store, in the storage unit, the gamma value corresponding to the specific grayscale of the specific dimming level and a target luminance and a target color coordinate, which correspond to a temperature of the pixel unit, which is measured from the temperature sensor.

The timing controller may display an image corresponding to a specific grayscale of a specific dimming level in the pixel unit during a manufacturing process, load, from the look-up table, the gamma value corresponding to the specific grayscale of the specific dimming level and a temperature of the pixel unit, which is measured from the temperature sensor, and store the gamma value in the storage unit.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 4 is a diagram illustrating an embodiment of a look-up table LUT included in the control device shown in FIG. 3.

FIG. 6 is a diagram illustrating an embodiment of the look-up table included in the control device shown in FIG. 3.

DETAILED DESCRIPTION

Figure 1:
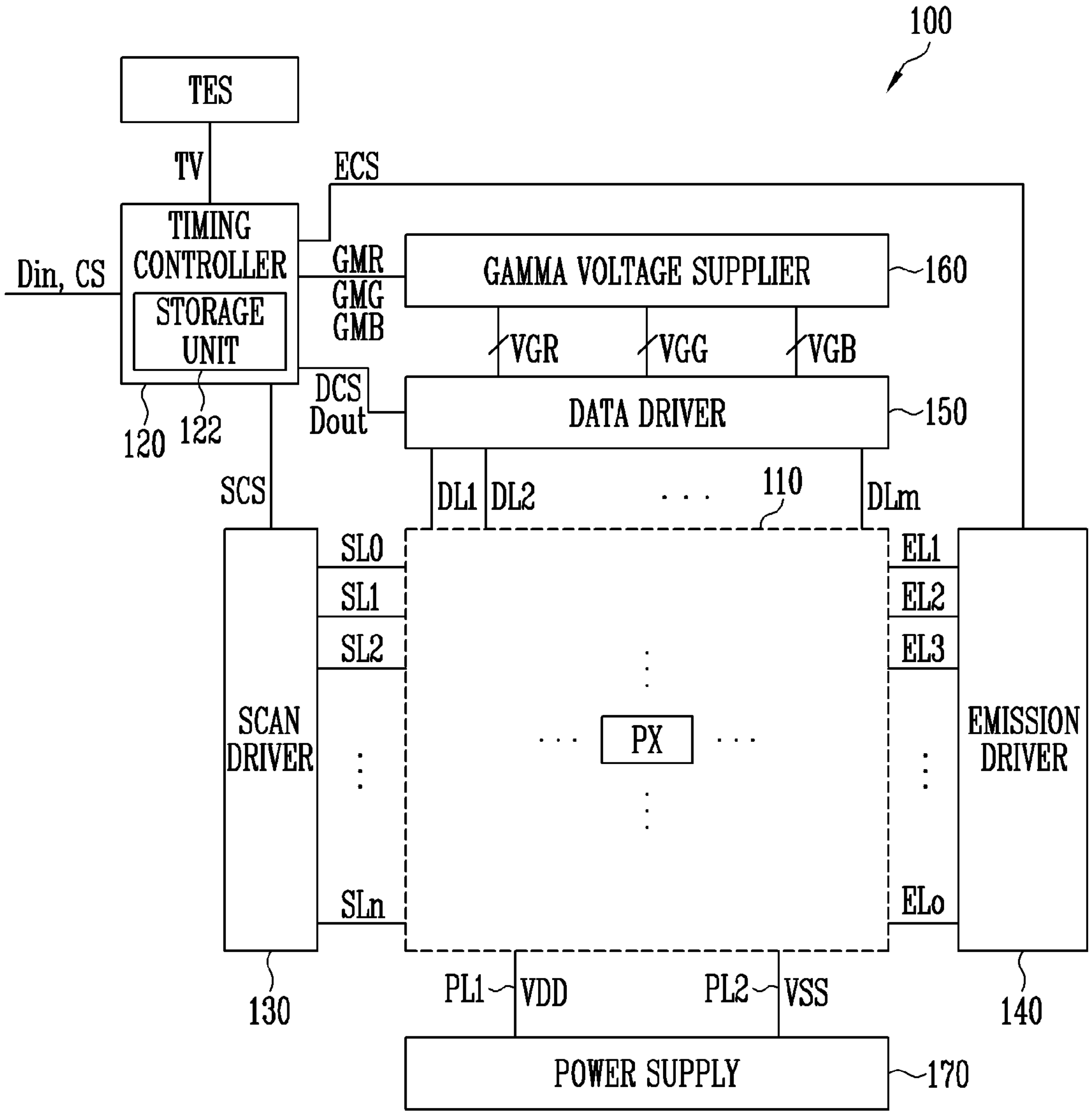
FIG. 1 is a diagram illustrating a display device in accordance with an embodiment of the present disclosure.

Hereinafter, exemplary embodiments are described in detail with reference to the accompanying drawings so that those skilled in the art may easily practice the present disclosure. The present disclosure may be implemented in various different forms and is not limited to the exemplary embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In description, the expression "equal" may mean "substantially equal." That is, this may mean equality to a degree to which those skilled in the art can understand the equality. Other expressions may be expressions in which "substantially" is omitted.

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the present disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the present disclosure. Also, in some embodiments, the blocks, the units, and/or the modules may be physically separated into more complex blocks, more complex units, and/or more complex modules without departing from the scope of the present disclosure.

The term "connection" between two components may include both electrical connection and physical connection, but the present disclosure is not necessarily limited thereto. For example, the term "connection" used based on circuit diagrams may mean electrical connection, and the term "connection" used based on sectional and plan views may mean physical connection.

It will be understood that, although the terms "first," "second," etc. may be used herein to describe various elements, these elements should not be limited by these terms. These terms are only used to distinguish one element from another element. Thus, a "first" element discussed below could also be termed a "second" element without departing from the teachings of the present disclosure.

Meanwhile, the present disclosure is not limited to embodiments disclosed below, and may be implemented in various forms. Each embodiment disclosed below may be independently embodied or be combined with at least another embodiment prior to being embodied.

FIG. 1 is a diagram illustrating a display device in accordance with an embodiment of the present disclosure.

Referring to FIG. 1, the display device 100 in accordance with the embodiment of the present disclosure may include a pixel unit 110 (or display panel), a timing controller 120, a scan driver 130, an emission driver 140, a data driver 150, a gamma voltage supplier 160, a power supply 170, and a temperature sensor TES. The timing controller 120, the scan driver 130, the emission driver 140, the data driver 150, the gamma voltage supplier 160, the power supply 170, and the temperature sensor TES may constitute a driving device which drives the pixel unit 110.

The pixel unit 110 may display images. The pixel unit 110 may be any one of an organic light emitting display panel, a liquid crystal display panel, an electrophoretic display panel, and an inorganic light emitting display panel. The pixel unit 110 may include pixels PX connected to scan lines SL0, SL1, SL2, . . . , and SLn, data lines DL1, DL2, . . . , and DLm, emission control lines EL1, EL2, EL3, . . . , and ELo), and power lines PL1 and PL2 (n, m, and o are natural numbers of 2 or more).

The pixels PX may be disposed in areas defined by the scan lines SL0 to SLn, the data line DL1 to DLm, and the emission control lines EL1 to ELo. Each of the pixels PX may be connected to any one of the scan lines SL0 to SLn, any one of the data lines DL1 to DLm, and any one of the emission control lines EL1 to ELo. For example, a pixel PXij (see FIG. 9) located on an ith row and a jth column may be connected to an (i−1) th scan line SLi−1, an ith scan line SLi, a jth data line DLj, and a kth emission control line ELk.

Here, k may be a number equal to or smaller than i. In an example, when each of the emission control lines EL1 to ELo is connected to pixels PX located on one horizontal line, k may be a number equal to i. In an example, when each of the emission control lines EL1 to ELo is connected to pixels PX located on two or more horizontal lines, k may be a number smaller than i.

Each of the pixels PX may be electrically connected between a first power line PL1 and a second power line PL2. A voltage of a first power source VDD may be applied to the first power line PL1, and a voltage of a second power source VSS may be applied to the second power line PL2. The first power source VDD and the second power source VSS may be power voltages or driving voltages, necessary for operations of the pixels PX, and the first power source VDD may have a voltage level higher than a voltage level of the second power source VSS during the pixels PX emit light.

Each of the pixels PX may be supplied with a data signal from a data line connected thereto when a scan signal (or enable scan signal) is supplied to a scan line connected thereto. The pixel supplied with the data signal may emit light with a luminance corresponding to the data signal to the outside. To this end, the pixels PX may include pixels of a first color, pixels of a second color, and pixels of a third color. The first color, the second color, and the third color may be different colors. In an example, the first color may be red, the second color may be green, and the third color may be blue. In another example, the first color may be magenta, the second color may be cyan, and the third color may be yellow.

Additionally, signal lines (e.g., a scan line, a data line, and an emission control line) connected to each of the pixels PX and a driving method of the pixel may be changed corresponding to a structure of the pixel. In an example, the emission control line may be removed corresponding to the structure of the pixel. In an embodiment of the present disclosure, the pixel may be selected as any one of various pixels currently known in the art.

The scan driver 130 may generate scan signals in response to a scan driving signal SCS from the timing controller 120 and sequentially supply the scan signals to the scan lines SL0 to SLn. In an example, the timing controller 120 may supply the scan driving signal SCS including a scan start signal, a clock signal, and the like to the scan driver 130. The scan driver 130 may be implemented as a shift register which sequentially generates and outputs the scan signal while shifting the scan start signal according to the clock signal.

The emission driver 140 may generate emission control signals in response to an emission driving signal ECS from the timing controller 120 and sequentially supply the emission control signals to the emission control lines EL1 to ELo. In an example, the timing controller 120 may supply the emission driving signal ECS including an emission start signal, a clock signal, and the like to the emission driver 140. The emission driver 140 may be implemented as a shift register which sequentially generates and outputs the emission control signal while shifting the emission start signal according to the clock signal.

The scan driver 130 and the emission driver 140 may be formed together with the pixels PX in the pixel unit 110. However, the present disclosure is not limited thereto. For example, the scan driver 130 and/or the emission driver 140 may be mounted on a circuit film, and be connected to the timing controller 120 via at least one circuit film and at least one printed circuit board.

The data driver 150 may be supplied with a data driving signal DCS and output data Dout from the timing controller 120. The data driving signal DCS may include a sampling signal and/or timing signals, necessary for driving of the data driver 150. Also, the data driver 150 may be supplied with gamma voltages VGR, VGG, and VGB from the gamma voltage supplier 160.

The data driver 150 may select any one of the gamma voltages VGR, VGG, and VGB which corresponds to a grayscale of the output data Dout, thereby generating a data signal. The data driver 150 may supply the data signal to the pixel unit 110 one pixel row (or horizontal line) at a time. The one pixel row may mean a row in which pixels connected to the same scan line are disposed.

The gamma voltage supplier 160 may be supplied with gamma values GMR, GMG, and GMB from the timing controller 120. The gamma values GMR, GMG, and GMB may include a first gamma value GMR, a second gamma value GMG, and a third gamma value GMB.

The first gamma value GMR may include a plurality of data (or signals), and have a gamma value corresponding to the pixels of the first color. The second gamma value GMG may include a plurality of data (or signals), and have a gamma value corresponding to the pixels of the second color. The third gamma value GMB may include a plurality of data, and have a gamma value corresponding to the pixels of the third color.

The gamma voltage supplier 160 may supply a first gamma voltage VGR to the data driver 150 corresponding to the first gamma value GMR. The first gamma voltage VGR may include gamma voltages corresponding to each of grayscales (e.g., 256 grayscales), and the data driver 150 may generate a data signal to be supplied to the pixels of the first color using the first gamma voltage VGR.

The gamma voltage supplier 160 may supply a second gamma voltage VGG to the data driver 150 corresponding to the second gamma value GMG. The second gamma voltage VGG may include gamma voltages corresponding to each of grayscales (e.g., 256 grayscales), and the data driver 150 may generate a data signal to be supplied to the pixels of the second color using the second gamma voltage VGG.

The gamma voltage supplier 160 may supply a third gamma voltage VGB to the data driver 150 corresponding to the third gamma value GMB. The third gamma voltage VGB may include gamma voltages corresponding to each of grayscales (e.g., 256 grayscales), and the data driver 150 may generate a data signal to be supplied to the pixels of the third color using the third gamma voltage VGB.

In FIG. 1, it is illustrated that the gamma voltage supplier 160 and the data driver 150 are components separate from each other. However, the embodiment of the present disclosure is not limited thereto. In an example, the gamma voltage supplier 160 and the data driver 150 may be embedded into one integrated circuit.

The timing controller 120 may receive input data Din and a control signal CS from a host system through an interface. In an example, the timing controller 120 may receive the input data Din and the control signal CS from at least one of a Graphics Processing Unit (GPU), a Central Processing Unit (CPU), and an Application Processor (AP), which are included in the host system. Various signals including a clock signal may be included in the control signal CS.

The timing controller 120 may generate the scan driving signal SCS, the data driving signal DCS, and the emission driving signal ECS based on the control signal CS. The scan driving signal SCS, the data driving signal DCS, and the emission driving signal ECS may be supplied to the scan driver 130, the data driver 150, and the emission driver 140, respectively.

The timing controller 120 may rearrange the input data Din to be suitable for specifications of the display device 100. Also, the timing controller 120 may generate output data Dout by correcting the input data Din, and supply the output data Dout to the data driver 150. In an embodiment, the timing controller 120 may correct the input data Din corresponding to an optical measurement result measured during a manufacturing process.

A storage unit 122 may be provided inside the timing controller 120. Gamma values GMR, GMG, and GMB corresponding to gamma voltages may be stored in the storage unit 122. In an example, the gamma values GMR, GMG, and GMB may be stored during the manufacturing process. A value of each of the gamma values GMR, GMG, and GMB may be set in consideration of a temperature of the display device 100, and accordingly, an image can be stably displayed regardless of temperature.

The power supply 170 may generate various power sources necessary for driving the display device 100. In an example, the power supply 170 may generate the first power source VDD and the second power source VSS. The power supply 170 may further generate various power sources (e.g., an initialization power source), corresponding to the structure of the pixels PX. The first power source VDD may be a power source which supplies a driving current to the pixels PX. The second power source VSS may be a power source which is supplied with the driving current from the pixels PX. The first power source VDD may be set to a voltage higher than a voltage of the second power source VSS during a period in which the pixels PX are set to be in an emission state.

The voltage of the first power source VDD generated by the power supply 170 may be supplied to the first power line PL1, and the voltage of the second power source VSS generated by the power supply 170 may be supplied to the second power line PL2. The first power line PL1 and the second power line PL2 may be commonly connected to the pixels PX, but the embodiment of the present disclosure is not limited thereto. In an embodiment, the first power line PL1 may include a plurality of power lines, and the plurality of power lines may be connected to different pixels PX. In an embodiment, the second power line PL2 may include a plurality of power lines, and the plurality of power lines may be connected to different pixels PX.

The temperature sensor TES may sense a temperature of the pixel unit 110, and supply a temperature value TV corresponding to the sensed temperature to the timing controller 120. The timing controller 120 may change the gamma values GMR, GMG, and GMB corresponding to the temperature value TV.

Figure 2A:
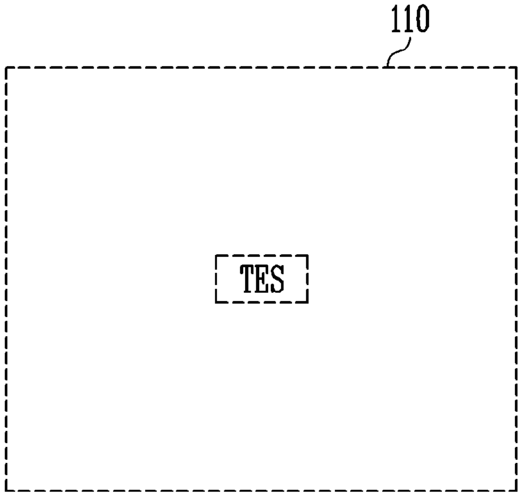
FIGS. 2A and 2B are diagrams illustrating positions of a temperature sensor in accordance with an embodiment of the present disclosure.
Figure 2B:
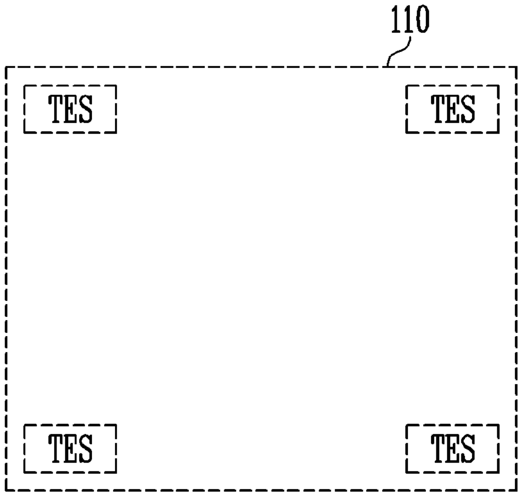

FIGS. 2A and 2B are diagrams illustrating positions of the temperature sensor in accordance with an embodiment of the present disclosure.

Referring to FIG. 2A, the temperature sensor TES may be disposed to overlap with the pixel unit 110. In an example, the temperature sensor TES may be located at a central portion of the pixel unit 110, and supply a temperature value TV corresponding to a temperature of the central portion of the pixel unit 110 to the timing controller 120. The timing controller 120 may calculate a temperature of the entire pixel unit 110 based on the temperature value TV.

Referring to FIG. 2B, at least two temperature sensors TES may be disposed at outer portions of the pixel unit 110. In an example, the temperature sensor TES may be respectively disposed at the outer portions of the pixel unit 110, and supply temperature values TV corresponding to temperatures of the outer portions of the pixel unit 110 to the timing controller 120. The timing controller 120 may calculate (e.g., average) a temperature of the entire pixel unit 110 based on the temperature values TV.

Figure 3:
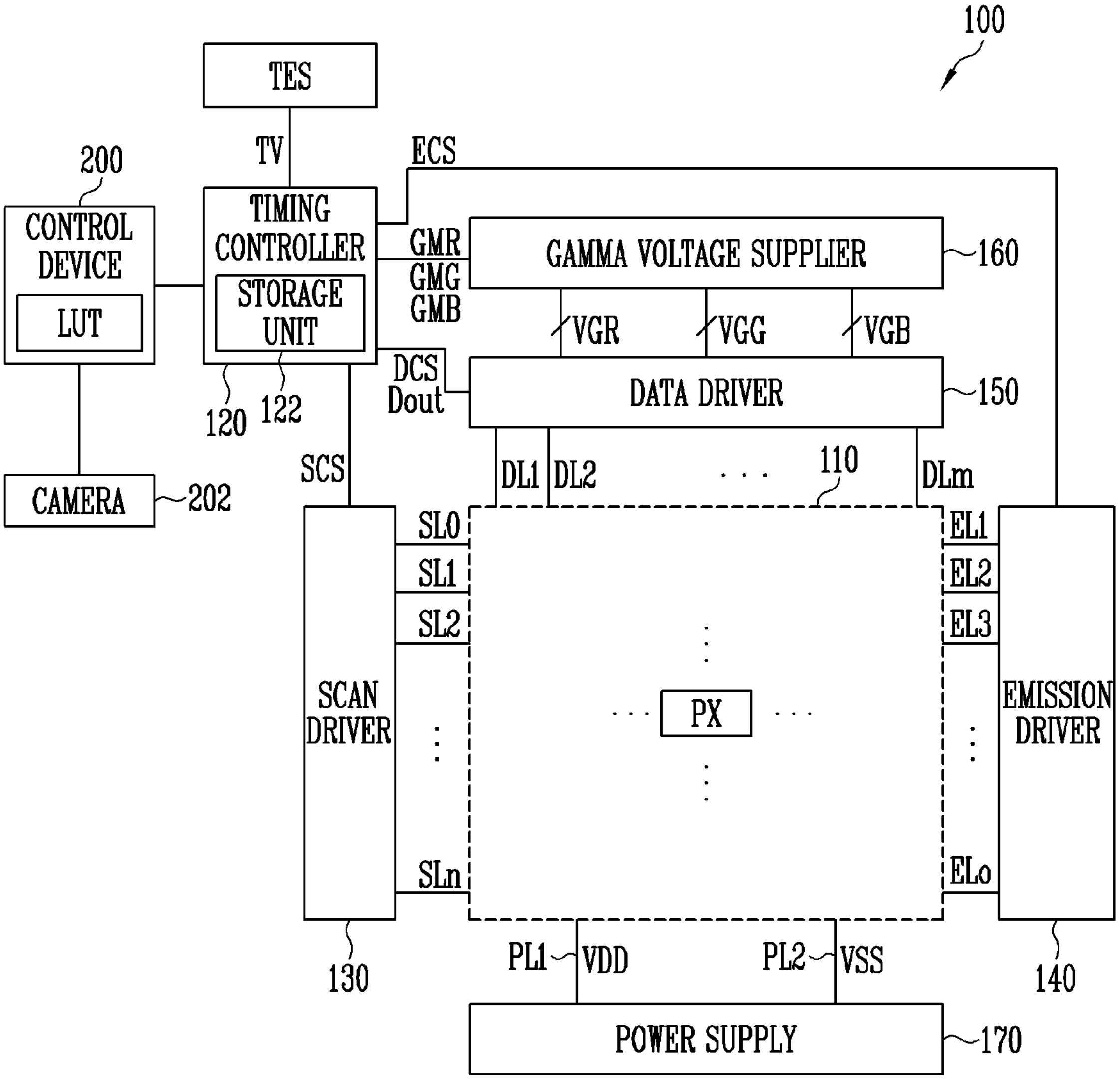
FIG. 3 is a diagram illustrating a state in which a control device for setting a gamma value during a manufacturing process is attached to the display device.
Figure 5:
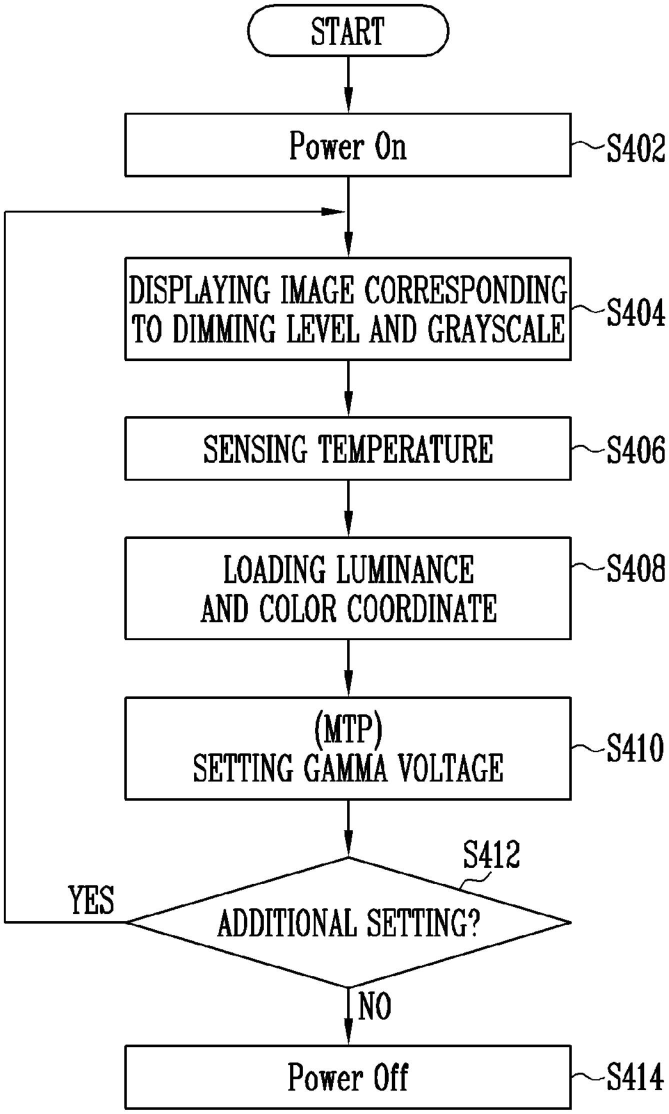
FIG. 5 is a flowchart illustrating an embodiment of a process of setting a gamma value (or gamma voltage).

FIG. 3 is a diagram illustrating a state in which a control device for setting a gamma value during the manufacturing process is attached to the display device. FIG. 4 is a diagram illustrating an embodiment of a look-up table LUT included in the control device shown in FIG. 3. FIG. 5 is a flowchart illustrating an embodiment of a process of setting a gamma value (or gamma voltage). The gamma value may be set for each display device 100 through Multi-Time Programming (MTP).

Referring to FIG. 3, a control device 200 for setting a gamma value may be electrically connected to the timing controller 120 such that a gamma value (or gamma voltage) is set during the manufacturing process.

The control device 200 may be connected to a camera 202. The camera 202 may sense an image displayed in the pixel unit 110 and supply the image to the control device 200. The control device 200 may determine a luminance and a color coordinate of the pixel unit 110 by using the image supplied from the camera 202.

The control device 200 may include a look-up table LUT, and information for setting a gamma value may be stored in the look-up table LUT. In an example, the look-up table LUT may include a plurality of dimming levels DEV1, . . . , and DEVp (p is a natural number of 2 or more) as shown in FIG. 4, and each of the dimming levels DEV1, . . . , and DEVp may include a plurality of grayscales (e.g., 10 Gray, 60 Gray, . . . , and 255 Gray). In addition, luminance and color coordinate information to be displayed in the pixel unit 110 when each of the plurality of grayscales is driven at at least two different temperatures (e.g., 0° C., 10° C., . . . , 40° C., 50° C., . . . ) may be stored in the look-up table LUT.

The look-up table LUT may include a maximum luminance which can be emitted from the pixel unit 110 according to the dimming levels DEV1, . . . , and DEVp. For example, as the dimming levels DEV1, . . . , and DEVp increase, the maximum luminance which can be emitted from the pixel unit 110 may increase too. The maximum luminance may be a luminance measured when the entire pixel unit 110 emits light with a maximum grayscale which is set in the display device 100.

The plurality of grayscales included in each of the dimming levels DEV1, . . . , and DEVp may mean grayscales displayed in the pixel unit 110 when a gamma value is set.

The plurality of grayscales may be pre-stored in the look-up table LUT such that the gamma value is stably set. The plurality of grayscales shown in FIG. 4 are merely illustrative, and the grayscales included in each of the dimming levels DEV1, . . . , and DEVp may be variously set.

A plurality of temperatures included in each of the grayscales may mean temperatures of the pixel unit 110 (or temperatures of the display device 100). In addition, luminance and color coordinate information (or gamma value setting information) corresponding to each of the plurality of temperatures may mean target luminance and target color coordinate information of an image displayed in the pixel unit 110 when the display device 100 is driven at a specific dimming level, a specific grayscale, and a specific temperature. The plurality of temperatures shown in FIG. 4 are merely illustrative, and the temperatures stored in the look-up table LUT may be variously set.

When temperature information is included in the look-up table LUT, a gamma value (or gamma voltage) may be set in consideration of the temperature information (or a temperature characteristic) during the manufacturing process. As such, when the temperature characteristic is reflected on the gamma value, the display quality of the display device 100 can be improved and a processing time can be shortened.

More specifically, when the temperature information is not included in the look-up table LUT, the gamma value may be set at a room temperature. Since a temperature of a processing line is to be set to the room temperature, a predetermined time may be required. In addition, the temperature of the pixel unit 110 may be changed in a gamma value setting process, and a desired luminance (and a desired color coordinate) may not be displayed in the display device 100 since the temperature characteristic is not reflected on the gamma value.

Referring to FIG. 5, power may be supplied to the display device 100 to set up a gamma value during the manufacturing process (S402). After the power is input to the display device 100, the control device 200 may supply processing data (or data) and a processing gamma value corresponding to a dimming level DEV and a grayscale Gray to the timing controller 120. The processing gamma value may be an initial gamma value that dose not reflect the characteristic of the display device 100.

The processing data may be supplied to the data driver 150 via the timing controller 120, and the processing gamma value may be supplied to the gamma voltage supplier 160 via the timing controller 120. The gamma voltage supplier 160 supplied with the processing gamma value may supply gamma voltages VGR, VGG, and VGB corresponding to the processing gamma value to the data driver 150.

The data driver 150 supplied with the processing data may generate a data signal using the gamma voltages VGR, VGG, and VGB, and supply the data signal to the pixel unit 110. An image corresponding to a specific dimming level and a specific grayscale may be displayed in the pixel unit 110 (S404).

When a predetermined image is displayed in the pixel unit 110, the temperature sensor TES may sense a temperature of the pixel unit 110, and supply a temperature value TV corresponding to the sensed temperature to the timing controller 120 (S406). The timing controller 120 may supply the temperature value TV to the control device 200. Then, the control device 200 may load a luminance and a color coordinate from the look-up table LUT which correspond to the temperature (S408).

In an example, when processing data corresponding to a first dimming level DEV1 and 255 Gray are supplied, and the temperature value TV corresponds to 40° C., the control device 200 may load a luminance of 1000 nit and a color coordinate of x=0.313 and y=0.329 in the step S408. In an example, when the processing data corresponding to the first dimming level DEV1 and the 255 Gray are supplied, and the temperature value TV corresponds to 50° C., the control device 200 may load a luminance of 1500 nit and a color coordinate of x=0.320 and y=0.335 in the step S408.

The predetermined image displayed in the pixel unit 110 may be captured by the camera 202 and supplied to the control device 200. The control device 200 may determine a luminance and a color coordinate of the predetermined image displayed in the pixel unit 110 by using the captured image supplied from the camera 202. After that, the control device 200 may change the processing gamma value such that an image of the luminance and the color coordinate, which are loaded in the step S408 in the pixel unit 110, can be displayed in the pixel unit 110 (S410). Also, the control device 200 may store the processing gamma value in the storage unit 122 when the image of the luminance and the color coordinate, which are loaded in the step S408 in the pixel unit 110, is displayed in the pixel unit 110 as gamma values GMR, GMG, and GMB. The gamma values GMR, GMG, and GMB on which a temperature characteristic is reflected may be stored in the storage unit 122.

After gamma values GMR, GMG, and GMB corresponding to a specific dimming level and a specific grayscale are stored in the step S410, the control device 200 may determine whether additional gamma value setting is required (S412). In an embodiment, the control device 200 may store gamma values GMR, GMG, and GMB corresponding to all grayscale values included in each of a plurality of dimming levels in the storage unit 122 while repeating the steps S404 to S410.

When the additional gamma value setting is not required in the step S412, the power supply of the display device 100 may be suspended (S414). In an embodiment of the present disclosure, the gamma values GMR, GMG, and GMB may be stored in the storage unit 122 during the manufacturing process while going through the steps S402 to S414.

FIG. 6 is a diagram illustrating an embodiment of the look-up table included in the control device shown in FIG. 3.

Referring to FIG. 6, the control device 200 may include a look-up table LUT, and information for setting a gamma value may be stored in the look-up table LUT. In an example, grayscales (e.g., 10 Gray, 60 Gray, . . . , and 255 Gray) displayed at each of dimming levels DEV1, . . . , and DEVp may be included in the look-up table LUT. In addition, gamma values GMR, GMG, and GMB corresponding to temperatures (e.g., 0° C., 10° C., . . . , 40° C., 50° C., . . . ) of each of the grayscales may be stored in the look-up table LUT.

In an example, a plurality of dimming levels DEV1, . . . , and DEVp may be included in the look-up table LUT, and each of the plurality of dimming levels DEV1, . . . , and DEVp may include a plurality of grayscales (e.g., 10 Gray, 60 Gray, . . . , and 255Gray). Grayscale information shown in FIG. 6 is merely illustrative, and the grayscales in each of the dimming levels DEV1, . . . , and DEVp may be variously set.

Each of the grayscales may include a plurality of temperature information (e.g., 0° C., 10° C., . . . , 40° C., 50° C., . . . ). The temperature information may correspond to a temperature of the pixel unit 110, and gamma values GMR, GMG, and GMB (or gamma value setting information) corresponding to each temperature may be stored in the look-up table LUT.

In an embodiment, first gamma values GMR (GMR11*a*, GMR12*a*, . . . , GMR13*a*, GMR14*a*, . . . , GMR21*a*, GMR22*a*, . . . , GMR23*a*, GMR24*a*, . . . , GMR31*a*, GMR32*a*, . . . , GMR33*a*, and GMR34*a*) respectively corresponding to temperatures of grayscales at a first dimming level DEV1 may be stored in the look-up table LUT. In an embodiment, first gamma values GMR (GMR11*b*, GMR12*b*, . . . , GMR13*b*, GMR14*b*, . . . . GMR21*b*, GMR22*b*, . . . , GMR23*b*, GMR24*b*, . . . , GMR31*b*, GMR32*b*, . . . , GMR33*b*, and GMR34*b*) respectively corresponding to temperatures of grayscales at a pth dimming level DEVp may be stored in the look-up table LUT. The first gamma values GMR may be experimentally predetermined.

In an embodiment, second gamma values GMG (GMG11*a*, GMG12*a*, . . . GMG13*a*, GMG14*a*, GMG21*a*, GMG22*a*, . . . , GMG23*a*, GMG24*a*, . . . , GMG31*a*, GMG32*a*, . . . , GMG33*a*, and GMG34*a*) respectively corresponding to the temperatures of the grayscales at the first dimming level DEV1 may be stored in the look-up table LUT. In addition, second gamma values GMG (GMG11*b*, GMG12*b*, . . . , GMG13*b*, GMG14*b*, . . . , GMG21*b*, GMG22*b*, . . . , GMG23*b*, GMG24*b*, . . . , GMG31*b*, GMG32*b*, . . . , GMG33*b*, and GMB34*b*) respectively corresponding to the temperatures of the grayscales at the pth dimming level DEVp may be stored in the look-up table LUT. The second gamma values GMG may be experimentally predetermined.

In an example, third gamma values GMB (GMB11*a*, GMB12*a*, . . . , GMB13*a*, GMB14*a*, . . . , GMB21*a*, GMB22*a*, . . . , GMB23*a*, GMB24*a*, . . . . GMB31*a*, GMB32*a*, . . . , GMB33*a*, and GMB34*a*) respectively corresponding to the temperatures of the grayscales at the first dimming level DEV1 may be stored in the look-up table LUT. In addition, third gamma values GMB (GMB11*b*, GMB12*b*, . . . , GMB13*b*, GMB14*b*, . . . , GMB21*b*, GMB22*b*, . . . , GMB23*b*, GMB24*b*, . . . , GMB31*b*, GMB32*b*, . . . , GMB33*b*, and GMB34*b*) respectively corresponding to the temperatures of the grayscales at the pth dimming level DEVp may be stored in the look-up table LUT. The third gamma values GMB may be experimentally predetermined.

Figure 7:
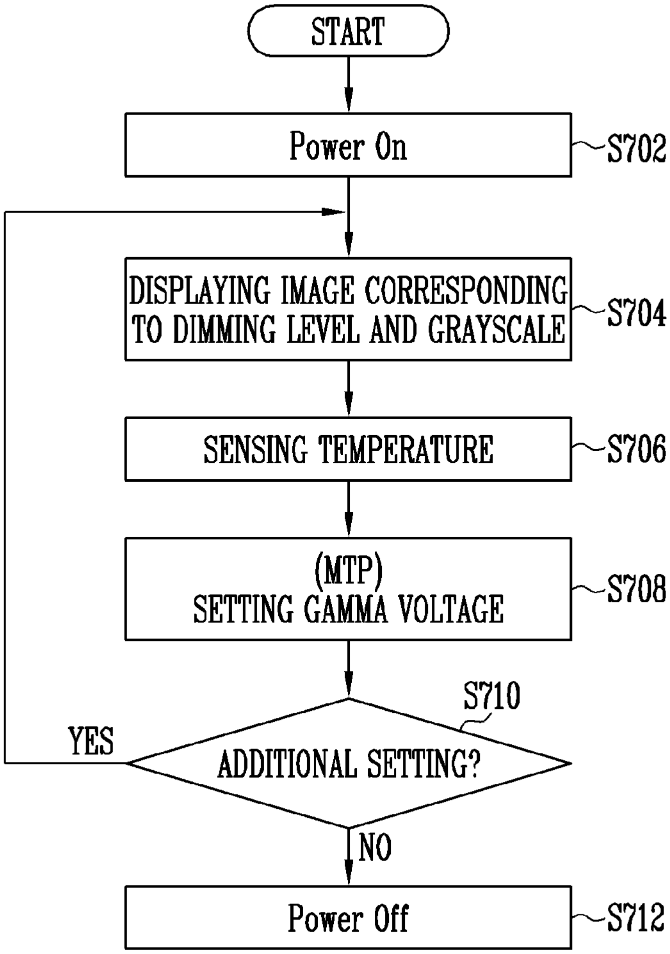
FIG. 7 is a flowchart illustrating an embodiment of a process of setting a gamma value using the look-up table shown in FIG. 6.

FIG. 7 is a flowchart illustrating an embodiment of a process of setting a gamma value using the look-up table shown in FIG. 6.

Referring to FIGS. 6 and 7, power may be supplied to the display device 100 to set up a gamma value during the manufacturing process (S702). After the power is input to the display device 100, the control device 200 may supply processing data and a processing gamma value corresponding to a dimming level DEV and a grayscale Gray to the timing controller 120. The processing data may be supplied to the data driver 150 via the timing controller 120 and the processing gamma value may be supplied to the gamma voltage supplier 160 via the timing controller 120. The gamma voltage supplier 160 supplied with the processing gamma value may supply gamma voltages VGR, VGG, and VGB corresponding to the processing gamma value to the data driver 150.

The data driver 150 supplied with the processing data may generate a data signal using the gamma voltages VGR, VGG, and VGB, and supply the data signal to the pixel unit 110. An image corresponding to a specific dimming level and a specific grayscale may be displayed in the pixel unit 110 (S704).

When a predetermined image is displayed in the pixel unit 110, the temperature sensor TES may sense a temperature of the pixel unit 110, and supply a temperature value TV corresponding to the sensed temperature to the timing controller 120 (S706). The timing controller 120 may supply the temperature value TV to the control device 200.

The control device 200 supplied with the temperature value TV may load gamma values GMR, GMG, and GMB corresponding to the dimming level DEV, the grayscale Gray, and the temperature value TV, and store the corresponding gamma values in the storage unit 122.

In an example, when the processing data corresponding to the first dimming level DEV1 and the 255 Gray are supplied, and the temperature value TV corresponds to 40° C., in in step S708, the control device 200 may store a first gamma value GMR33*a*, a second gamma value GMG33*a*, and a third gamma value GMB33*a* in the storage unit 122. In an example, when the processing data corresponding to the first dimming level DEV1 and the 255 Gray are supplied, and the temperature value TV corresponds to 50° C., in the step S708, the control device 200 may store a first gamma value GMR34*a*, a second gamma value GMG34*a*, and a third gamma value GMB34*a* in the storage unit 122.

After gamma values GMR, GMG, and GMB corresponding to a specific dimming level and a specific grayscale are stored in step S708, the control device 200 may determine whether additional gamma value setting is required (S710). The control device 200 may store gamma values GMR, GMG, and GMB corresponding to all grayscale values included in each of a plurality of dimming levels, in the storage unit 122 while repeating the steps S704 to S708.

When the additional gamma value setting is not required in the step S7410, the power supply of the display device 100 may be suspended (S712). The display device 100 in accordance with the embodiment of the present disclosure may store the gamma values GMR, GMG, and GMB in the storage unit 122 during the manufacturing process while going through the steps S702 to S712.

When the look-up table shown in FIG. 6 is stored in the control device 200, the control device 200 may store gamma values GMR, GMG, and GMB corresponding to a specific dimming level, a specific grayscale, and a specific temperature in the storage unit 122 without capturing any image displayed in the pixel unit 110. Accordingly, the camera 202 shown in FIG. 3 may be omitted.

Figure 8:
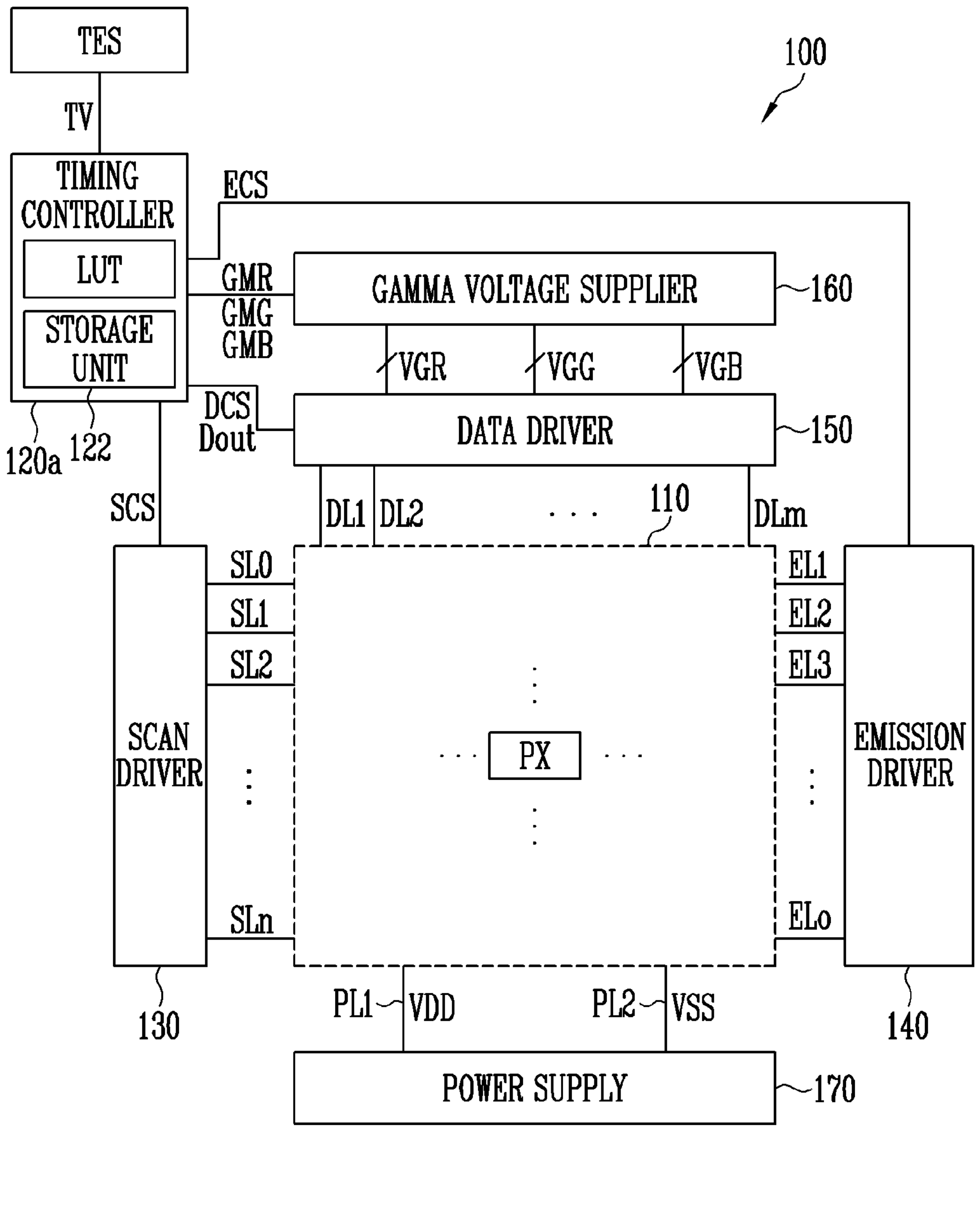
FIG. 8 is a diagram illustrating a display device in accordance with an embodiment of the present disclosure.

FIG. 8 is a diagram illustrating a display device in accordance with an embodiment of the present disclosure. In FIG. 8, descriptions of portions overlapping with those shown in FIG. 3 will be omitted.

Referring to FIG. 8, the display device 100 in accordance with the embodiment of the present disclosure may include a pixel unit 110 (or display panel), a timing controller 120*a*, a scan driver 130, an emission driver 140, a data driver 150, a gamma voltage supplier 160, a power supply 170, and a temperature sensor TES.

The timing controller 120*a* may include a storage unit 122 and a look-up table LUT. Information for setting a gamma value may be stored in the look-up table LUT.

In an example, luminance and color coordinate information to be displayed in the pixel unit 100, corresponding to grayscales (e.g., 10 Gray, 60 Gray, . . . , and 255 Gray) displayed at each of dimming levels DEV1, . . . , and DEVp and temperatures (e.g., 0° C., 10° C., . . . , 40° C., 50° C., . . . ) of each of the grayscales as shown in FIG. 4, may be stored in the look-up table LUT. In an example, gamma values GMR, GMG, and GMB corresponding to grayscales (e.g., 10 Gray, 60 Gray, . . . , and 255 Gray) displayed at each of dimming levels DEV1, . . . , and DEVp and temperatures (e.g., 0° C., 10° C., . . . , 40° C., 50° C., . . . ) of each of the grayscales as shown in FIG. 6 may be stored in the look-up table LUT.

When the look-up table LUT is included in the timing controller 120*a* and an initial gamma value is stored in the storage unit 122 during a manufacturing process, the control device 200 shown in FIG. 3 may be omitted. That is, the control device 200 may be replaced with the timing controller 120*a*. To this end, processing data respectively corresponding to grayscales Gray included in a dimming level DEV, a processing gamma value, and the like may be additionally stored in the storage unit 122.

A process of setting gamma values GMR, GMG, and GMB using the timing controller 120*a* during the manufacturing process is substantially the same as described in FIGS. 5 and 7, and accordingly, detailed descriptions will be omitted.

Figure 9:
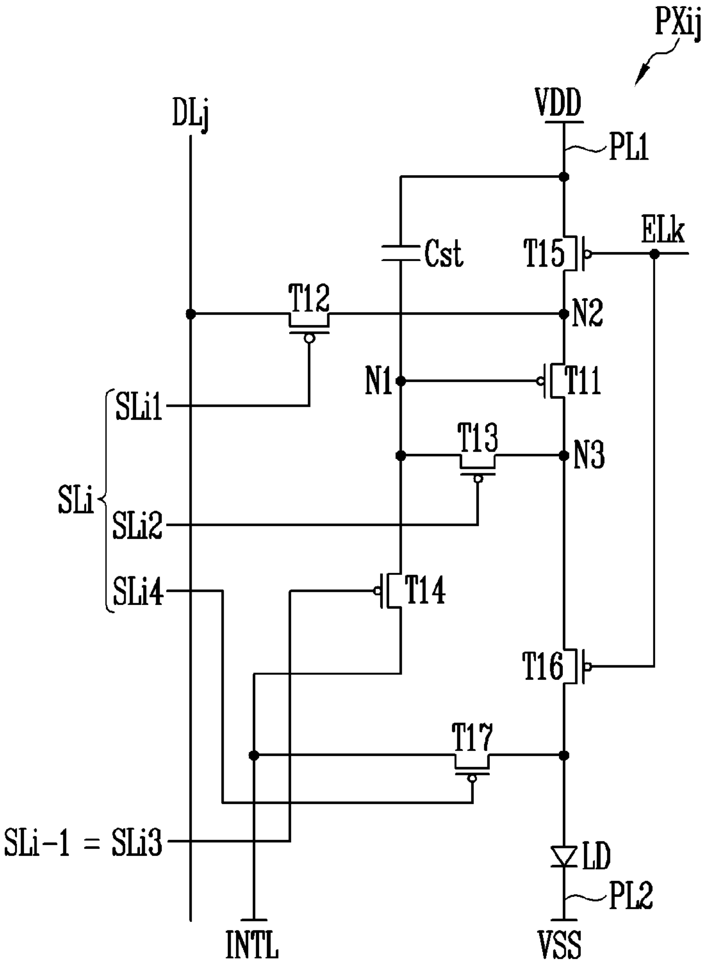
FIG. 9 is a diagram illustrating an embodiment of a pixel shown in FIG. 1.

FIG. 9 is a diagram illustrating an embodiment of the pixel shown in FIG. 1.

Referring to FIG. 9, a pixel PXij may include transistors T11, T12, T13, T14, T15, T16, and T17, a storage capacitor Cst, and a light emitting element LD.

Hereinafter, a circuit implemented with a P-type transistor is described as an example. However, those skilled in the art may design a circuit implemented with an N-type transistor by changing the polarity of a voltage applied to a gate terminal. Similarly, those skilled in the art may design a circuit implemented with a combination of the P-type transistor and the N-type transistor. The transistor may have various forms including a Thin Film Transistor (TFT), a Field Effect Transistor (FET), a Bipolar Junction Transistor (BJT), and the like.

A gate electrode of an eleventh transistor T11 may be connected to a first node N1, a first electrode of the eleventh transistor T11 may be connected to a second node N2, and a second electrode of the eleventh transistor T11 may be connected to a third node N3. The eleventh transistor T11 may be referred to as a driving transistor.

A gate electrode of a twelfth transistor T12 may be connected to a scan line SLi1, a first electrode of the twelfth transistor T12 may be connected to a data line DLj, and a second electrode of the twelfth transistor T12 may be connected to the second node N2. A gate electrode of a thirteenth transistor T13 may be connected to a scan line SLi2, a first electrode of the thirteenth transistor T13 may be connected to the first node N1, and a second electrode of the thirteenth transistor T13 may be connected to the third node N3.

A gate electrode of a fourteenth transistor T14 may be connected to a scan line SLi3, a first electrode of the fourteenth transistor T14 may be connected to the first node N1, and a second electrode of the fourteenth transistor T14 may be connected to an initialization line INTL. A gate electrode of the fifteenth transistor T15 may be connected to a kth emission control line ELk, a first electrode of the fifteenth transistor T15 may be connected to a first power line PL1, and a second electrode of the fifteenth transistor T15 may be connected to the second node N2.

A gate electrode of the sixteenth transistor T16 may be connected to the kth emission control line ELk, a first electrode of the sixteenth transistor T16 may be connected to the third node N3, and a second electrode of the sixteenth transistor T16 may be connected to an anode of the light emitting element LD. In an embodiment, the fifteenth transistor T15 and the sixteenth transistor T16 may be connected to different emission control lines.

A gate electrode of a seventeenth transistor T17 may be connected to a scan line SLi4, a first electrode of the seventeenth transistor T17 may be connected to the initialization line INTL, and a second electrode of the seventeenth transistor T17 may be connected to the anode of the light emitting element LD. A first electrode of the storage capacitor Cst may be connected to the first power line PL1, and a second electrode of the storage capacitor Cst may be connected to the first node N1.

The anode of the light emitting element LD may be connected to the second electrode of the sixteenth transistor T16, and a cathode of the light emitting element LD may be connected to a second power line PL2. The light emitting element LD may be a light emitting diode. The light emitting element LD may be configured as an organic light emitting diode, an inorganic light emitting diode, a quantum dot/well light emitting diode, or the like. The light emitting element LD may emits light of any one color among a first color, a second color, and a third color. In addition, in this embodiment, only one light emitting element LD is provided in each pixel. However, in another embodiment, a plurality of light emitting elements may be provided in each pixel. The plurality of light emitting elements may be connected in series, parallel, series/parallel, or the like.

A voltage of a first power source VDD may be applied to the first power line PL1, a voltage of a second power source VSS may be applied to the second power line PL2, and a voltage of an initialization power source may be applied to the initialization line INTL. For example, the voltage of the initialization power source may be equal to or higher than the voltage of the second power source VSS. For example, the voltage of the initialization power source may be equal to or higher than the voltage of the second power source VSS. For example, the voltage of the initialization power source may correspond to a data voltage having the smallest magnitude among magnitudes of data voltages which can be provided. In another example, the magnitude of the voltage of the initialization power source may be smaller than the magnitudes of the data voltages which can be provided.

Figure 10:
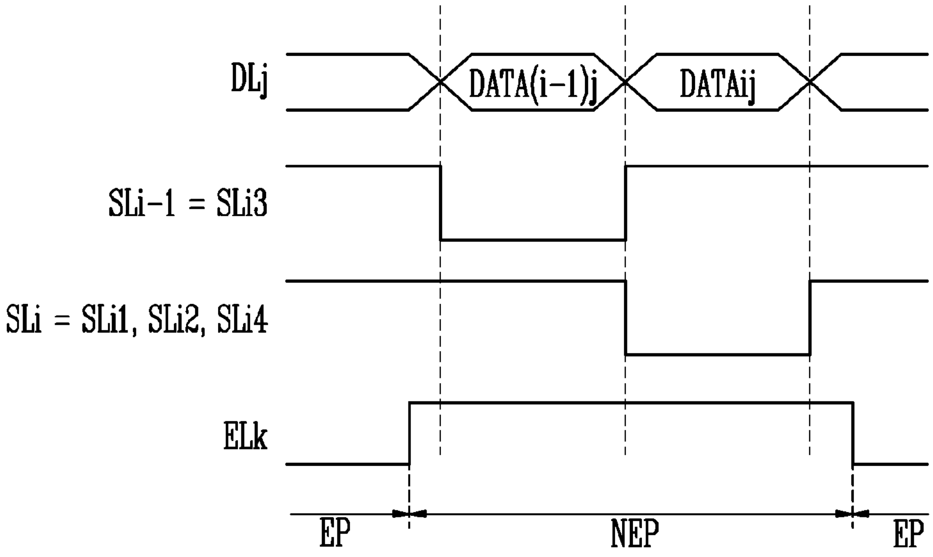
FIG. 10 is a diagram illustrating an exemplary driving method of the pixel shown in FIG. 9.

FIG. 10 is a diagram illustrating an exemplary driving method of the pixel shown in FIG. 9.

Hereinafter, for convenience of description, it is assumed that the scan lines SLi1, SLi2, and SLi4 correspond to an ith scan line SLi, and the scan line SLi3 corresponds to an (i−1) th scan line SLi−1. However, in some embodiments, a connection relationship between the scan lines SLi1, SLi2, SLi3, and SLi4 may be altered. For example, the scan line SLi4 may be an (i−1) th scan line or an (i+1) th scan line.

First, an emission control signal having a turn-off level (logic high level) is applied to the kth emission control line ELk, a data signal DATA(i−1)j for an (i−1) th pixel is applied to the data line DLj, and a scan signal having a turn-on level (logic low level) is applied to the scan line SLi3. High/low of a logic level may be changed according to whether a transistor is of a P-type or an N-type.

Since a scan signal having the turn-off level is applied to the scan lines SLi1 and SLi2, the twelfth transistor T12 is in a turn-off state, and the data signal DATA(i−1)j for the (i−1) th pixel is prevented from being input to the pixel PXij.

Since the fourteenth transistor T14 is in a turn-on state, the first node N1 is connected to the initialization line INTL, so that a voltage of the first node N1 is initialized. Since the emission control signal having the turn-off level is applied to the emission control line ELk, the transistors T15 and T16 are in the turn-off state, and unnecessary emission of the light emitting element LD in a process of applying the voltage of the initialization power source is prevented.

Next, a data signal DATAij for an ith pixel PXij is applied to the data line DLj, and the scan signal having the turn-on level is applied to the scan lines SLi1 and SLi2. Accordingly, the transistors T12, T11, and T13 are turned on, and the data line DLj and the first node N1 are electrically connected to each other. Therefore, a compensation voltage obtained by subtracting a threshold voltage of the eleventh transistor T11 from the data signal DATAij is applied to the second electrode of the storage capacitor Cst (i.e., the first node N1), and the storage capacitor Cst maintains a voltage corresponding to the difference between the voltage of the first power source VDD and the compensation voltage. Such a period may be referred to as a threshold voltage compensation period or a data writing period.

In addition, when the scan line SLi4 is the ith scan line, the seventeenth transistor T17 is in the turn-on state. Hence, the anode of the light emitting element LD and the initialization line INTL are connected to each other, and the light emitting element LD is initialized to a charge amount corresponding to the voltage difference between the voltage of the initialization power source and the voltage of the second power source VSS.

After that, as the emission control signal having the turn-on level is applied to the kth emission control line ELk, the transistors T15 and T16 may be electrically connected to each other. Therefore, a driving current path is formed, through which the first power line PL1, the fifteenth transistor T15, the eleventh transistor T11, the sixteenth transistor T16, the light emitting element LD, and the second power line PL2 are connected to each other.

An amount of driving current flowing through the first electrode and the second electrode of the eleventh transistor T11 is adjusted according to the voltage maintained in the storage capacitor Cst. The light emitting element LD emits light with a luminance corresponding to the amount of driving current. The light emitting element LD emits light until before the emission control signal having the turn-off level is applied to the emission control line ELk.

When an emission control signal has the turn-on level, pixels receiving the corresponding emission control signal may be in a display state. Therefore, the period in which the emission control signal has the turn-on level may be referred to as an emission period EP (or emission allow period). In addition, when an emission control signal has the turn-off level, pixels receiving the corresponding emission control signal may be in a non-display state. Therefore, the period in which the emission control signal has the turn-off level may be referred to as a non-emission period NEP (or emission inhibit period).

The non-emission period NEP described in FIG. 10 is used to prevent the pixel PXij from emitting light with an unwanted luminance during the initialization period and the data write period.

One or more non-emission periods NEP may be additionally provided while a data signal written to the pixel PXij is maintained (e.g., one frame period). This is for the purpose of reducing the emission period EP of the pixel PXij, thereby effectively expressing a low grayscale or gently blurring motion of an image.

In the display device and the gamma voltage setting method thereof in accordance with the present disclosure, a gamma voltage (or gamma value) can be set by reflecting a temperature characteristic during a manufacturing process, and accordingly, the display quality of the display device can be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A gamma voltage setting method of a display device, comprising:

supplying, to a data driver, data corresponding to a specific grayscale of a specific dimming level;

generating a data signal corresponding to the data in the data driver using a gamma voltage corresponding to a processing gamma value;

displaying an image corresponding to the data signal in a pixel unit;

determining a temperature of the pixel unit;

loading, from a look-up table, a target luminance and a target color coordinate, which correspond to the specific dimming level, the specific grayscale, and the temperature of the pixel unit;

generating a gamma value such that an image corresponding to the target luminance and the target color coordinate is displayed in the pixel unit; and storing the gamma value.

2. The gamma voltage setting method of claim 1, wherein the gamma value is stored in the display device during a manufacturing process of the display device.

3. The gamma voltage setting method of claim 1, wherein the gamma value includes a first gamma value corresponding to a pixel of a first color, a second gamma value corresponding to a pixel of a second color, and a third gamma value corresponding to a pixel of a third color.

4. The gamma voltage setting method of claim 1, wherein a plurality of dimming levels, a plurality of grayscales included in each of the plurality of dimming levels, and the target luminance and the target color coordinate, which correspond to at least two different temperatures in each of the plurality of grayscales, are stored in the look-up table.

5. The gamma voltage setting method of claim 1, further comprising sensing whether the image corresponding to the target luminance and the target color coordinate is displayed in the pixel unit using a camera.

6. A gamma voltage setting method of a display device, comprising:

supplying, to a data driver, data corresponding to a specific grayscale of a specific dimming level;

generating a data signal corresponding to the data in the data driver using a gamma voltage corresponding to a processing gamma value;

displaying an image in a pixel unit corresponding to the data signal;

determining a temperature of the pixel unit;

loading, from a look-up table, a gamma value corresponding to the specific dimming level, the specific grayscale, and the temperature of the pixel unit; and storing the gamma value.

7. The gamma voltage setting method of claim 6, wherein the gamma value is stored in the display device during a manufacturing process of the display device.

8. The gamma voltage setting method of claim 6, wherein the gamma value includes a first gamma value corresponding to a pixel of a first color, a second gamma value corresponding to a pixel of a second color, and a third gamma value corresponding to a pixel of a third color.

9. The gamma voltage setting method of claim 6, wherein a plurality of dimming levels, a plurality of grayscales included in each of the plurality of dimming levels, and the gamma value corresponding to at least two different temperatures in each of the plurality of grayscales are stored in the look-up table.

10. A display device comprising:

a pixel unit including pixels connected to scan lines and data lines;

a data driver configured to supply a data signal to the data lines;

a gamma voltage supplier configured to supply a gamma voltage to the data driver corresponding to a gamma value;

a timing controller including a storage unit configured to store the gamma value and a look-up table; and a temperature sensor configured to sense a temperature of the pixel unit, wherein a plurality of dimming levels, a plurality of grayscales included in each of the plurality of dimming levels, and gamma value setting information corresponding to at least two different temperatures in each of the plurality of grayscales are stored in the look-up table, and wherein the gamma value setting information corresponds to a target luminance and a target color coordinate of the pixel unit which correspond to the different temperatures, or the gamma value corresponding to the different temperatures.

11. The display device of claim 10, wherein the gamma value includes a first gamma value corresponding to a pixel of a first color, a second gamma value corresponding to a pixel of a second color, and a third gamma value corresponding to a pixel of a third color.

12. The display device of claim 10, wherein the timing controller:

displays an image corresponding to a specific grayscale of a specific dimming level in the pixel unit during a manufacturing process; and stores, in the storage unit, the gamma value corresponding to the specific grayscale of the specific dimming level and a target luminance and a target color coordinate, which correspond to a temperature of the pixel unit, which is measured from the temperature sensor.

13. The display device of claim 10, wherein the timing controller:

displays an image corresponding to a specific grayscale of a specific dimming level in the pixel unit during a manufacturing process; and loads, from the look-up table, the gamma value corresponding to the specific grayscale of the specific dimming level and a temperature of the pixel unit, which is measured from the temperature sensor, and stores the gamma value in the storage unit.

* * * * *